(12) United States Patent
Kim et al.

(10) Patent No.: US 9,838,694 B2
(45) Date of Patent: *Dec. 5, 2017

(54) METHODS AND APPARATUS FOR ILLUMINATION AND COLOR COMPENSATION FOR MULTI-VIEW VIDEO CODING

(71) Applicant: DOLBY LABORATORIES LICENSING CORPORATION, San Francisco, CA (US)

(72) Inventors: Jae Hoon Kim, Los Angeles, CA (US); Yeping Su, Cupertino, CA (US); Cristina Gomila, Cesson-Sevigne (FR)

(73) Assignee: Dolby Laboratories Licensing Corporation, San Francisco, CA (US)

(*) Notice: Subject to any disclaimer, the term of this patent is extended or adjusted under 35 U.S.C. 154(b) by 118 days.

This patent is subject to a terminal disclaimer.

(21) Appl. No.: 14/964,750

(22) Filed: Dec. 10, 2015

(65) Prior Publication Data

US 2016/0094848 A1    Mar. 31, 2016

Related U.S. Application Data

(63) Continuation of application No. 13/873,789, filed on Apr. 30, 2013, now Pat. No. 9,241,168, which is a (Continued)

(51) Int. Cl.
H04N 7/12 (2006.01)
H04N 19/136 (2014.01)
(Continued)

(52) U.S. Cl.
CPC ....... *H04N 19/136* (2014.11); *H04N 13/0037* (2013.01); *H04N 19/109* (2014.11); (Continued)

(58) Field of Classification Search
CPC .... H04N 19/176; H04N 19/196; H04N 19/46; H04N 19/463
(Continued)

(56) References Cited

U.S. PATENT DOCUMENTS 5,736,943 A    4/1998   Herre et al.
6,043,838 A    3/2000   Chen
(Continued)

FOREIGN PATENT DOCUMENTS

EP    0830034    3/1998
EP    1128366    8/2001
(Continued)

OTHER PUBLICATIONS

Fecker et al: "Luminance and chrominance compensation for multi-view sequences using histogram matching", 74.MPEG meeting, Oct. 17, 2005-Oct. 21, 2005, Nice, Motion Picture expert group or ISO/IEC JTC1/SC29/WG11, n° M12487, Sep. 30, 2005.
(Continued)

*Primary Examiner* — Gims Philippe

(57) ABSTRACT

There are provided a method and apparatus for illumination and color compensation for multi-view video coding. A video encoder includes an encoder for encoding a picture by enabling color compensation of at least one color component in a prediction of the picture based upon a correlation factor relating to color data between the picture and another picture. The picture and the other picture have different view points and both corresponding to multi-view content for a same or similar scene.

6 Claims, 5 Drawing Sheets

Related U.S. Application Data continuation of application No. 12/087,197, filed as application No. PCT/US2007/000091 on Jan. 4, 2007, now Pat. No. 8,902,977.

(60) Provisional application No. 60/757,372, filed on Jan. 9, 2006, provisional application No. 60/757,289, filed on Jan. 9, 2006.

(51) Int. Cl.

| | | |
|---|---|---|
| *H04N 13/00* | (2006.01) | |
| *H04N 19/597* | (2014.01) | |
| *H04N 19/50* | (2014.01) | |
| *H04N 19/176* | (2014.01) | |
| *H04N 19/70* | (2014.01) | |
| *H04N 19/46* | (2014.01) | |
| *H04N 19/196* | (2014.01) | |
| *H04N 19/109* | (2014.01) | |
| *H04N 19/463* | (2014.01) | |
| *H04N 19/186* | (2014.01) | |
| *H04N 19/174* | (2014.01) | |
| *H04N 19/507* | (2014.01) | |
| *H04N 19/593* | (2014.01) | |
| *H04N 19/172* | (2014.01) | |
| *H04N 19/82* | (2014.01) | |
| *H04N 19/10* | (2014.01) | |

(52) U.S. Cl.
CPC ......... *H04N 19/172* (2014.11); *H04N 19/174* (2014.11); *H04N 19/176* (2014.11); *H04N 19/186* (2014.11); *H04N 19/196* (2014.11); *H04N 19/46* (2014.11); *H04N 19/463* (2014.11); *H04N 19/50* (2014.11); *H04N 19/507* (2014.11); *H04N 19/593* (2014.11); *H04N 19/597* (2014.11); *H04N 19/70* (2014.11); *H04N 19/10* (2014.11); *H04N 19/82* (2014.11)

(58) Field of Classification Search
USPC ...... 375/240.12, 240.18; 382/154, 254, 162; 345/87; 386/248
See application file for complete search history.

(56) References Cited

U.S. PATENT DOCUMENTS

| | | | |
|---|---|---|---|
| 6,055,274 | A | 4/2000 | McVeigh |
| 6,191,808 | B1 | 2/2001 | Katayama et al. |
| 6,549,650 | B1 | 4/2003 | Ishikawa et al. |
| 6,760,474 | B1 * | 7/2004 | Fenne .................. H04N 19/85 375/E7.189 |
| 7,450,643 | B2 | 11/2008 | Chujoh et al. |
| 8,902,977 | B2 | 12/2014 | Kim et al. |
| 2001/0043784 | A1 * | 11/2001 | Shirata ................. H04N 9/8205 386/248 |
| 2001/0045979 | A1 | 11/2001 | Matsumoto et al. |
| 2003/0202592 | A1 | 10/2003 | Sohn et al. |
| 2003/0218606 | A1 | 11/2003 | Zhirkov et al. |
| 2005/0031035 | A1 | 2/2005 | Vedula et al. |
| 2005/0123207 | A1 | 6/2005 | Marpe et al. |
| 2006/0133493 | A1 | 6/2006 | Cho et al. |
| 2007/0121728 | A1 * | 5/2007 | Wang .................. H04N 19/563 375/240.18 |

FOREIGN PATENT DOCUMENTS

| | | |
|---|---|---|
| JP | 6113335 | 4/1994 |
| JP | 7049944 | 2/1995 |
| JP | 8331607 | 12/1996 |
| JP | 11252585 | 3/1998 |
| JP | 10155104 | 6/1998 |
| JP | 2004007377 | 1/2004 |
| JP | 5224458 | 3/2013 |
| RU | 2124272 | 12/1998 |
| RU | 2237283 | 7/2002 |
| RU | 2001105183 | 6/2003 |
| WO | WO2004059980 | 7/2004 |

OTHER PUBLICATIONS

Amonou, I. et al "On the High Level Syntax for SVC" JVT of ISO/IEC MPEG & ITU-T VCEG (ISO/IECJTC1/SC29/WG11 and ITU-T SG16 Q.6) 16th Meeting, Jul. 24-29, 2005.

Yip, P.Y. et al. "Joint Source and Channel Coding for H.264 Compliant Stereos Copic Video Transmission" Electrical and Computer Engineering, Dec. 31, 2005.

ISO/IEC JTC1/SC29/WG 11 N68909: "Survey of Algorithms Used for Multi-View Coding (MVC)", Jan. 2005.

ISO 2382-1:1993, Information Technology Vocabulary; part 1: Fundamental Terms translated into Russian by L.V. Shutkin, Nov. 25, 2005, All Russian Science Institute of Problems in Computing and Information Techniques, http://www.pcmore.ru/informatisation/iso2381-1.html.

Lee et al., "Multi-View Video Coding Using Illumination Change-Adaptive Motion Estimation and 2-D Direct Mode", Lecture Notes in Computer Science, Advances in Multimedia Information Processing—PCM 2005 Springer Berlin/Heidelberg, vol. 3767, 2005, pp. 396-407.

Wiegand, "Joint Committee Draft (CD)", Joint Video Team (JVT) of ISO/IEC MPEG and ITU-T VCEG, Document: JVT-C167, Berlin Germany, 2002.

Aydinoglu H et al "Stereo image c oding" 1995, IEEE International Sympaosium on Circuits and Systems (ISCAS), Apr. 30-May 3, 1995, Seagle, vol. 1, pp. 247-250.

Joaquin Lopez, etal, BLock-based illumination compensation and search techniques for multiview video coding, Pucture Coding Symposium 2004, Dec. 15-17, 2004, University of California, Davis, US.

Kazuto Kamikura etal, Global brightness-variation compensation for v ideo coding, IEEE Transactions on circuits and systems for video technology, IEEE Service Center, Piscataway, NJ, US, vol. 8, No. 8, Dec. 1998.

Ding et al., Stereo Video Coding System with Hybrid Coding Based on Joint Prediction Scheme, IEEE International Symposium on Circuits and Systems, 2005, vol. 6, Abstract, pp. 6082-6085.

ITU-T Standard Recommendation H.262, "Generic Coding of Moving Pictures and Associated Audio: Video," ISO/IEC 13818-2 Amendment 3, ISO/IEC JTC1/SC29/WG11, Doc. N1366, Sep. 1996, pp. 1-32.

ITU-T Standard Recommendation H.262, "Updated Call for Proposals on Multi-View Video Coding," ISO/IEC JTC1/SC29/WG11 Doc: N7567, Oct. 2005, pp. 1-13.

Kim et al., "Fast Local Motion-Compensation Algorithm for Video Sequences with Brightness Variations," IEEE Transactions on Circuits and Systems for Video Technology, vol. 13, No. 4, Apr. 2003, pp. 289-299.

Liu et al., "Linear Transform Based Motion Compensated Prediction for Luminance Intensity Changes," ISCAS, IEEE, May 2005, pp. 304-307.

* cited by examiner

METHODS AND APPARATUS FOR ILLUMINATION AND COLOR COMPENSATION FOR MULTI-VIEW VIDEO CODING

CROSS-REFERENCE TO RELATED APPLICATIONS

This application is a continuation of co-pending U.S. patent application Ser. No. 13/873,789, filed Apr. 30, 2013, herein incorporated by reference in its entirety, which is a continuation of U.S. patent application Ser. No. 12/087,197, filed Jun. 25, 2008 and granted Dec. 2, 2014 as U.S. Pat. No. 8,902,977, and which claims the benefit, under 35 U.S.C. §365 of International Application No. PCT/US2007/000091, which was filed on Jan. 4, 2007 and published in accordance with PCT Article 21(2) on Jul. 19, 2007, in English, and which claims the benefit of U.S. Provisional Application Ser. No. 60/757,372, entitled ILLUMINATION AND COLOR COMPENSATION SYSTEM FOR MULTI-VIEW CODING, filed Jan. 9, 2006, and U.S. Provisional Application Ser. No. 60/757,289, filed Jan. 9, 2006, entitled MULTI-VIEW VIDEO CODING SYSTEM, which are incorporated by reference herein in their entirety.

FIELD OF THE INVENTION

The present invention relates generally to video encoding and decoding and, more particularly, to methods and apparatus for illumination compensation and color compensation for Multi-view Video Coding (MVC). The color compensation may be applied to at least one color component.

BACKGROUND OF THE INVENTION

A Multi-view Video Coding (MVC) sequence is a set of two or more video sequences that capture the same scene from different view points. It has been widely recognized that Multi-view Video Coding is a key technology that serves a wide variety of applications, including free-viewpoint and 3D video applications, home entertainment, surveillance, and so forth. In those multi-view applications, a very large amount of video data is often involved.

In a practical scenario, Multi-view Video Coding systems involving a large number of cameras are built using heterogeneous cameras, or cameras that have not been perfectly calibrated. This leads to differences in luminance and chrominance when the same parts of a scene are viewed with different cameras. Moreover, camera distance and positioning also affects illumination, in the sense that the same surface may reflect light differently when perceived from different angles. Under these scenarios, luminance and chrominance differences will decrease the efficiency of cross-view prediction.

Several prior art approaches have been developed to solve the illumination mismatch problem between pairs of images. In a first prior art approach, it is decided based on cross entropy values whether to apply a local brightness variation model. If the cross entropy is larger than a threshold, global and local brightness variation compensation is applied using a multiplier (scale) and offset field. However, local parameters are only selected after the best matching block has been found, which can be disadvantageous when illumination mismatches are significant. Similarly, a second prior art approach proposes a modified motion estimation approach but a global illumination compensation model is used. Also, the second prior art approach proposes a block-by-block on/off control method, however such method is based on MSE. In a third prior art approach, an illumination mismatch problem in video sequences is addressed. In the third prior art approach, a scale/offset parameter for a 16×16 macroblock and predictive coding of the parameter are proposed. The third prior art approach also proposes a rate distortion cost based enabling switch. However, the third prior art approach mainly focuses on temporal video sequences. In video sequences, an illumination mismatch problem does not consistently occur as in cross-view prediction.

SUMMARY OF THE INVENTION

These and other drawbacks and disadvantages of the prior art are addressed by the present invention, which is directed to methods and apparatus for illumination compensation and color compensation for Multi-view Video Coding (MVC). The color compensation may be applied to at least one color component.

According to an aspect of the present invention, there is provided a video encoder. The video encoder includes an encoder for encoding a picture by enabling color compensation of at least one color component in a prediction of the picture based upon a correlation factor relating to color data between the picture and another picture. The picture and the other picture have different view points and both corresponding to multi-view content for a same or similar scene.

According to another aspect of the present invention, there is provided a video encoding method. The method includes encoding a picture by enabling color compensation of at least one color component in a prediction of the picture based upon a correlation factor relating to color data between the picture and another picture. The picture and the other picture have different view points and both corresponding to multi-view content for a same or similar scene.

According to yet another aspect of the present invention, there is provided a video decoder. The video decoder includes a decoder for decoding a picture by enabling color compensation of at least one color component in a prediction of the picture based upon a correlation factor relating to color data between the picture and another picture. The picture and the other picture have different view points and both corresponding to multi-view content for a same or similar scene.

According to a further aspect of the present invention, there is provided a video decoding method. The method includes decoding a picture by enabling color compensation of at least one color component in a prediction of the picture based upon a correlation factor relating to color data between the picture and another picture. The picture and the other picture have different view points and both corresponding to multi-view content for a same or similar scene.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

Figure 1:
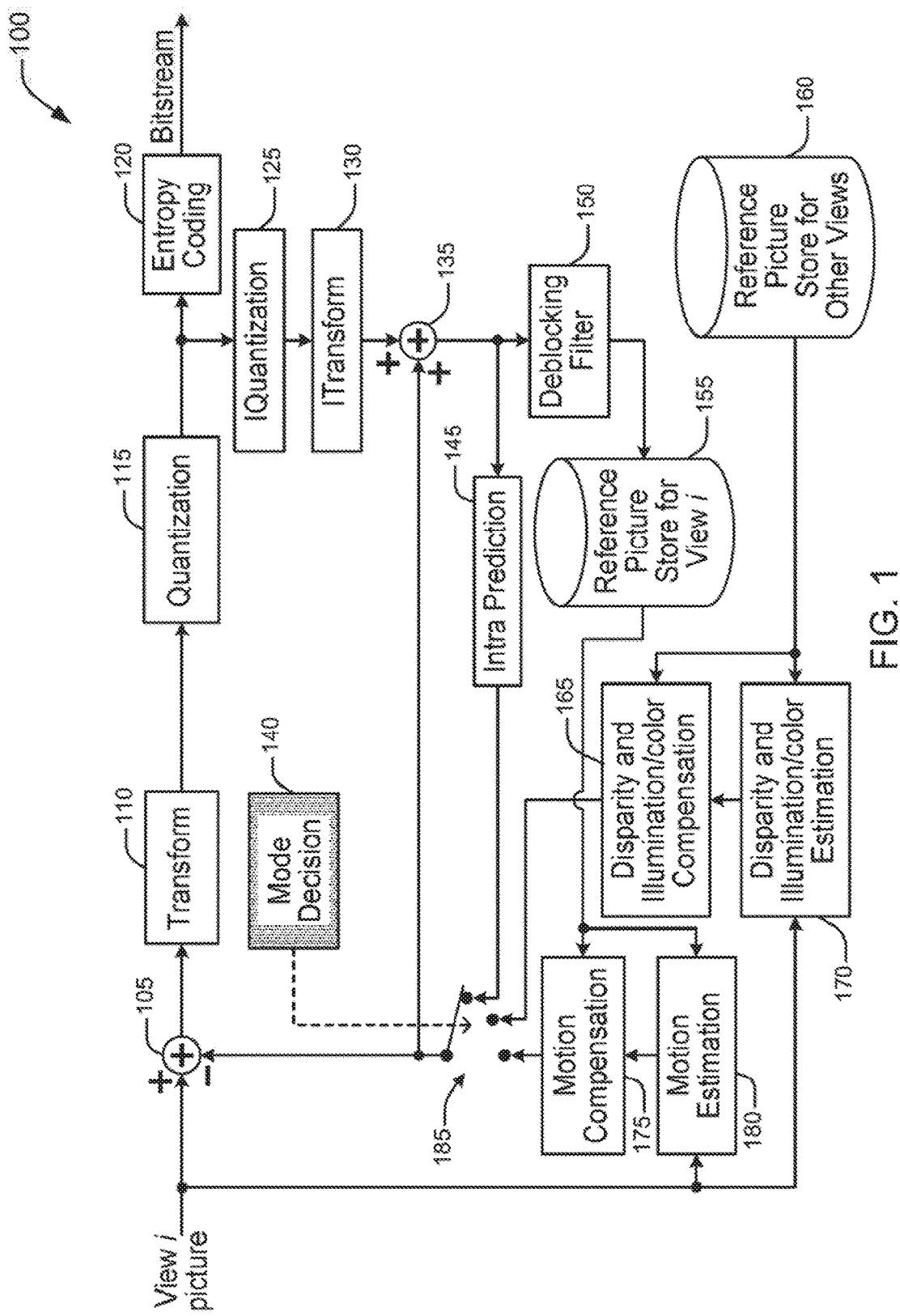
FIG. 1 is a block diagram for an exemplary Multi-view Video Coding (MVC) encoder to which the present principles may be applied in accordance with an embodiment thereof.

The present invention is directed to methods and apparatus for illumination compensation and color compensation for Multi-view Video Coding (MVC). The color compensation may be applied to at least one color component.

Advantageously, embodiments of the present invention provide improved coding compression of simulcast multi-view data. As used herein, a multi-view sequence is a set of two or more video sequences that capture the same scene from different view points. It is to be appreciated that the teachings of illumination compensation and color compensation as disclosed herein may be used jointly or separately in various embodiments of the present principles, while maintaining the scope of the present principles.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

Turning to FIG. 1, an exemplary Multi-view Video Coding (MVC) encoder to which the present principles may be applied is indicated generally by the reference numeral 100. The encoder 100 includes a combiner 105 having an output connected in signal communication with an input of a transformer 110. An output of the transformer 110 is connected in signal communication with an input of quantizer 115. An output of the quantizer 115 is connected in signal communication with an input of an entropy coder 120 and an input of an inverse quantizer 125. An output of the inverse quantizer 125 is connected in signal communication with an input of an inverse transformer 130. An output of the inverse transformer 130 is connected in signal communication with a first non-inverting input of a combiner 135. An output of the combiner 135 is connected in signal communication with an input of an intra predictor 145 and an input of a deblocking filter 150. An output of the deblocking filter 150 is connected in signal communication with an input of a reference picture store 155 (for view i). An output of the reference picture store 155 is connected in signal communication with a first input of a motion compensator 175 and a first input of a motion estimator 180. An output of the motion estimator 180 is connected in signal communication with a second input of the motion compensator 175

An output of a reference picture store 160 (for other views) is connected in signal communication with a first input of a disparity/illumination estimator 170 and a first input of a disparity/illumination compensator 165. An output of the disparity/illumination estimator 170 is connected in signal communication with a second input of the disparity/illumination compensator 165.

An output of the entropy decoder 120 is available as an output of the encoder 100. A non-inverting input of the combiner 105 is available as an input of the encoder 100, and is connected in signal communication with a second input of the disparity/illumination estimator 170, and a second input of the motion estimator 180. An output of a switch 185 is connected in signal communication with a second non-inverting input of the combiner 135 and with an inverting input of the combiner 105. The switch 185 includes a first input connected in signal communication with an output of the motion compensator 175, a second input connected in signal communication with an output of the disparity/illumination compensator 165, and a third input connected in signal communication with an output of the intra predictor 145.

A mode decision module 140 has an output connected to the switch 185 for controlling which input is selected by the switch 185.

Figure 2:
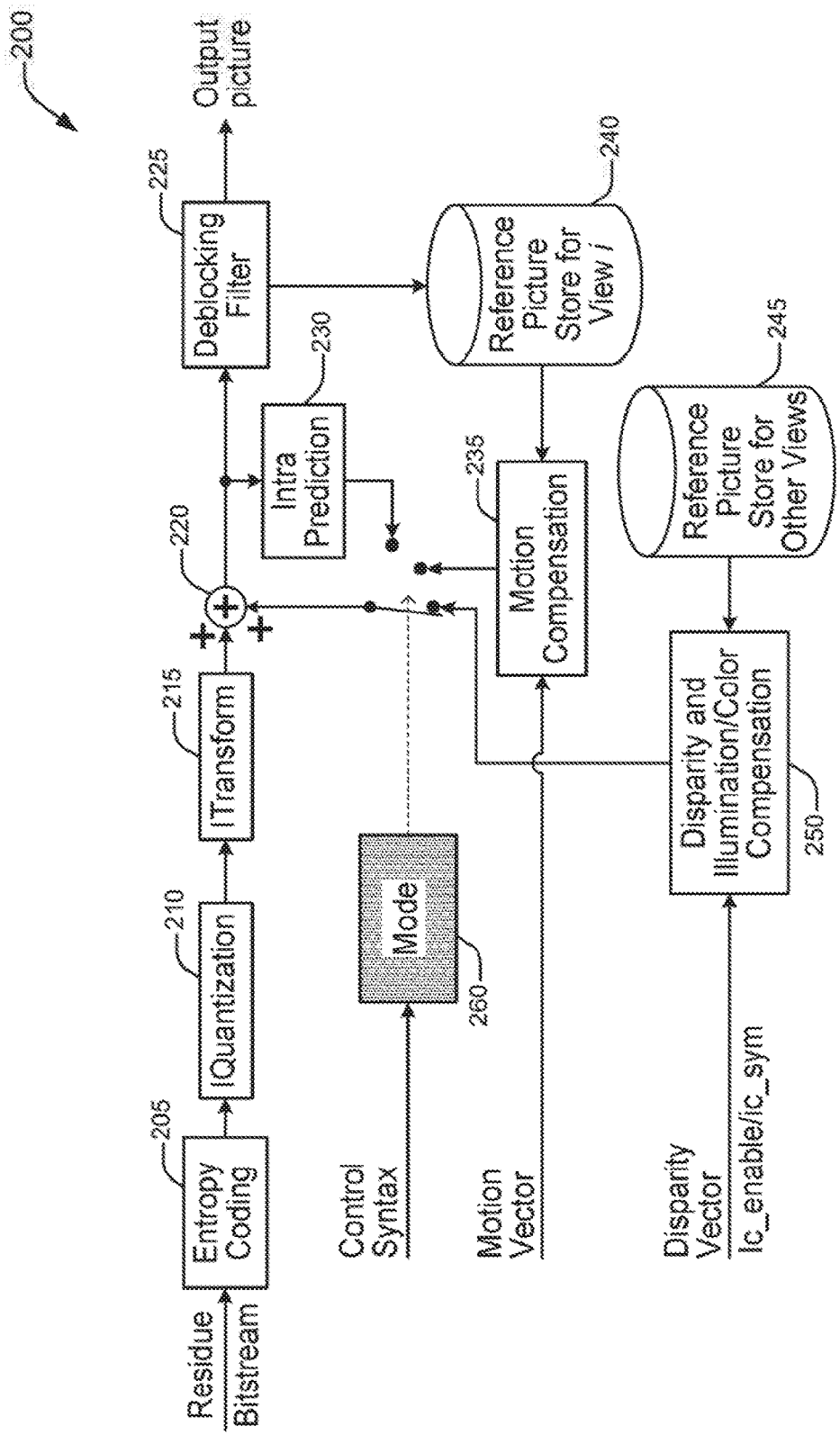
FIG. 2 is a block diagram for an exemplary Multi-view Video Coding (MVC) decoder to which the present principles may be applied in accordance with an embodiment thereof.

Turning to FIG. 2, an exemplary Multi-view Video Coding (MVC) decoder to which the present principles may be applied is indicated generally by the reference numeral 200. The decoder 200 includes an entropy decoder 205 having an output connected in signal communication with an input of an inverse quantizer 210. An output of the inverse quantizer is connected in signal communication with an input of an inverse transformer 215. An output of the inverse transformer 215 is connected in signal communication with a first non-inverting input of a combiner 220. An output of the combiner 220 is connected in signal communication with an input of a deblocking filter 225 and an input of an intra predictor 230. An output of the deblocking filter 225 is connected in signal communication with an input of a reference picture store 240 (for view i). An output of the reference picture store 240 is connected in signal communication with a first input of a motion compensator 235.

An output of a reference picture store 245 (for other views) is connected in signal communication with a first input of a disparity/illumination compensator 250.

An input of the entropy coder 205 is available as an input to the decoder 200, for receiving a residue bitstream. Moreover, an input of a mode module 260 is also available as an input to the decoder 200, for receiving control syntax to control which input is selected by the switch 255. Further, a second input of the motion compensator 235 is available as an input of the decoder 200, for receiving motion vectors. Also, a second input of the disparity/illumination compensator 250 is available as an input to the decoder 200, for receiving disparity vectors and illumination compensation syntax.

An output of a switch 255 is connected in signal communication with a second non-inverting input of the combiner 220. A first input of the switch 255 is connected in signal communication with an output of the disparity/illumination compensator 250. A second input of the switch 255 is connected in signal communication with an output of the motion compensator 235. A third input of the switch 255 is connected in signal communication with an output of the intra predictor 230. An output of the mode module 260 is connected in signal communication with the switch 255 for controlling which input is selected by the switch 255. An output of the deblocking filter 225 is available as an output of the decoder 200.

Embodiments of the present principles are directed to the efficient coding of multi-view video sequences. A multi-view video sequence is a set of two or more video sequences that capture the same scene from different view points. In particular, various embodiments in accordance with the present principles are directed to illumination compensation and/or color compensation for encoding and decoding multi-view video sequences.

The present principles take into account that since a multi-view video source involves multiple views of the same scene, there exists a high degree of correlation between the multiple view images. Therefore, view redundancy can be exploited in addition to temporal redundancy, and is achieved by performing view prediction across the different views (cross-view prediction).

For illustrative purposes, the description provided herein is directed to a Multi-view Video Coding extension of the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard"). However, it is to be appreciated that the present principles are also applicable to other video coding standards, as are readily determined by one of ordinary skill in this and related arts. That is, given the teachings of the present principles provided herein, one of ordinary skill in this and related arts will readily be able to implement the present principles with respect to various video coding standards including the MPEG-4 AVC standard and other video coding standards, while maintaining the scope of the present principles.

In the framework of the MPEG-4 AVC standard, illumination compensation can be considered part of the disparity compensation process, where cross-view prediction (view prediction across different views of a multi-view sequence) includes an offset to address illumination differences across different camera views. Due to the strong correlation among spatially neighboring blocks, the offset can be differentially encoded before being quantized and entropy encoded. The illumination compensation may be implemented to be switchable on a block-basis since different signal blocks suffer from different levels of illumination mismatch. In addition to illumination compensation, color compensation design is also proposed to address color discrepancies among different camera views.

In an illustrative embodiment of the present principles involving illumination compensation and color compensation, directed to the Multi-view Video Coding (MVC) extension of the MPEG-4 AVC standard, an exemplary framework is set forth as follows. At the slice level, a new syntax element (ic_prediction_flag) is introduced to indicate whether illumination compensation is enabled for the current slice. At the macroblock-level, two new syntax elements are introduced: one (ic_enable) is introduced to indicate the utilization of illumination compensation for each block; another (ic_sym) is introduced to convey the illumination offset parameter.

Figure 3:
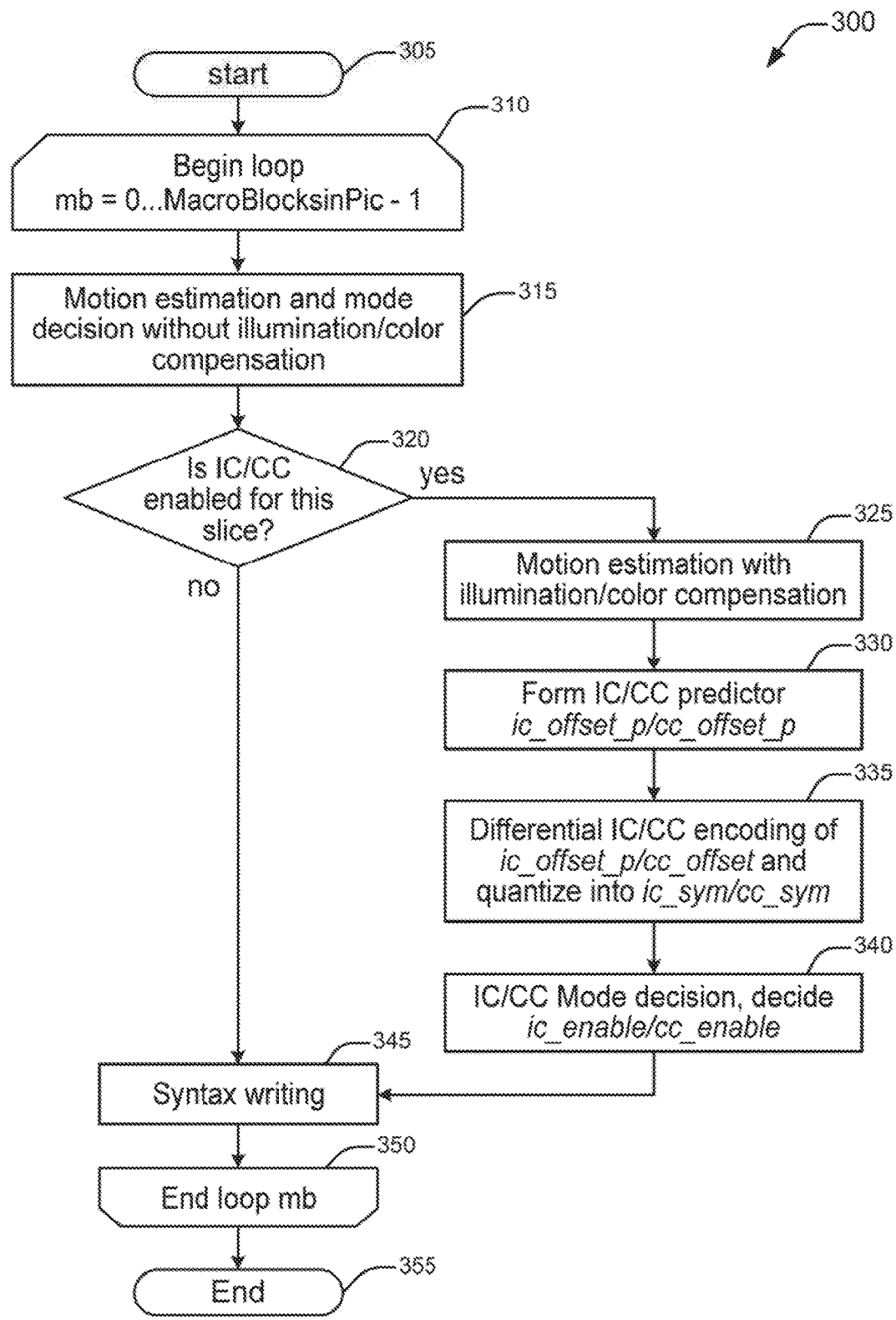
FIG. 3 is a flow diagram for an exemplary video encoding method with illumination compensation for multi-view video content in accordance with an embodiment of the present principles.

Turning to FIG. 3, an exemplary video encoding method with illumination compensation for multi-view video content is indicated generally by the reference numeral 300. The method 300 includes a start block 305 that passes control to a loop limit block 310. The loop limit block 310 begins a loop over each macroblock in a current slice including setting a range from the loop using a variable mb=0 to MacroBlockInPic-1, and passes control to a decision block 315. The decision block 315 determines whether or not illumination compensation (IC) is enabled for the current slice. If so, the control is passed to a function block 320. Otherwise, control is passed to a function block 350.

The function block 320 performs motion estimation with illumination compensation, and passes control to a function block 325. The function block 325 forms an IC predictor ic_offset_p, and passes control to a function block 330. The function block 330 performs differential illumination compensation encoding of ic_offset, quantizes ic_offset into ic_sym, and passes control to a function block 335. The function block 335 performs an illumination compensation mode decision, decides the ic_prediction_flag, and passes control to a function block 340. The function block 340 performs syntax writing, and passes control to a loop limit block 345. The loop limit block 345 ends the loop over each macroblock in the current slice, and passes control to an end block 355.

The function block 350 performs motion estimation and renders a motion decision without illumination compensation, and passes control to the function block 340.

Figure 4:
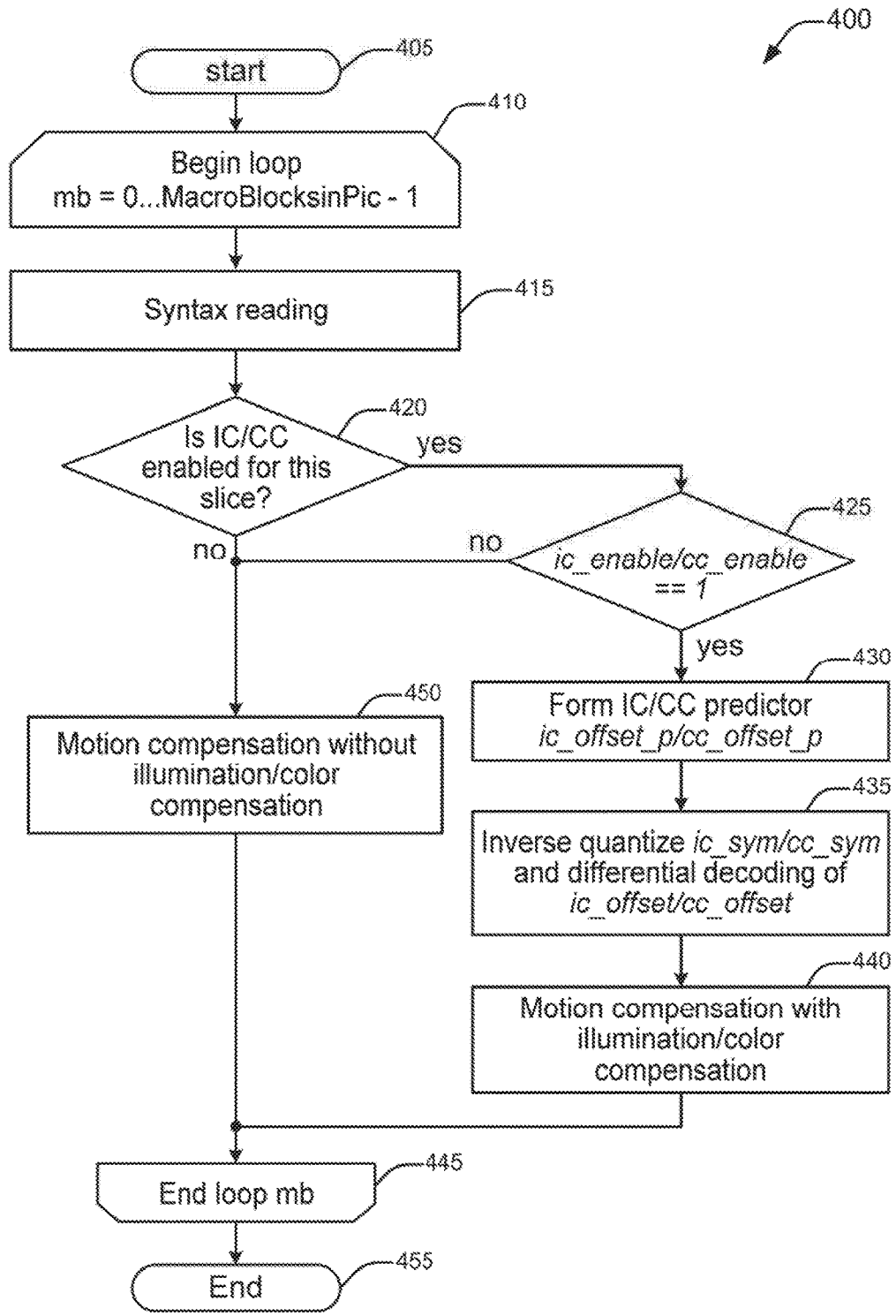
FIG. 4 is a flow diagram for an exemplary video decoding method with illumination compensation for multi-view video content in accordance with an embodiment of the present principles.

Turning to FIG. 4, an exemplary video decoding method with illumination compensation for multi-view video content is indicated generally by the reference numeral 400. The method 400 includes a start block 405 that passes control to a loop limit block 410. The loop limit block 410 begins a loop over each macroblock in a current slice including setting a range for the loop using a variable mb=0 to MacroBlocksInPic-1, and passes control to a function block 415. The function block 415 reads syntax, and passes control to a decision block 420. The decision block 420 determines whether or not illumination compensation is enabled for the current slice. If so, then control is passed to a decision block 425. Otherwise, control is passed to a function block 450.

The decision block 425 determines whether or not ic_prediction_flag is equal to 1. If so, the control is passed to a function block 430. Otherwise, control is passed to the function block 450.

The function block 430 forms an IC predictor ic_offset_p, and passes control to a function block 435. The function block 435 inverse quantizes ic_sym, differentially decodes ic_offset, and passes control to a function block 440. The function block 440 performs motion compensation with illumination, and passes control to a loop limit block 445. The loop limit block 445 ends the loop over each macroblock in the current slice, and passes control to an end block 455.

The function block 450 performs motion compensation without illumination compensation, and passes control to the loop limit block 445.

A description will now be given regarding the use of illumination compensation as part of the cross-view prediction process in accordance with an exemplary embodiment of the present principles.

Illumination compensation is done in the context of cross-view prediction for Multi-view Video Coding. In this scenario, cross-view prediction typically involves the computation of a disparity field between pictures from different views. The disparity field is in cross-view prediction what the motion field is in temporal prediction. When applied to a coding scheme, cross-view prediction is an effective tool to exploit view redundancy.

For the sake of simplicity, it will be presumed in the following that cross-view prediction and, by extension, disparity estimation, is performed on a block basis. However, it is to be appreciated that, given the teachings of the present principles provided herein, the extension of such teachings to other groups of samples is readily determined and implemented by one of ordinary skill in this and related arts, while maintaining the scope of the present principles.

Also, it is to be further appreciated that while some embodiments of the present principles are described herein with respect to being applied to a Multi-view Video Coding extension of the MPEG-4 AVC standard, for which motion compensation and disparity compensation are enabled, given the teachings of the present principles provided herein, implementations of the present principles may also be directed to any other Multi-view Video Coding schemes for which disparity compensation is enabled, as readily determined and implemented by one of ordinary skill in the and related arts, while maintaining the scope of the present principles.

Moreover, it is to be appreciated that while some embodiments of the present principles directed to illumination compensation are described herein with respect to Multi-view Video Coding, given the teachings of the present principles provided herein, one of ordinary skill in this and related arts will readily contemplate other video-related scenarios to which the present principles may be applied, while maintaining the scope of the present principles. For example, the present principles may be applied, but are not limited to, image registration and camera calibration.

A description will now be given regarding the transmission of illumination compensation syntax elements in accordance with an exemplary embodiment of the present principles.

In exemplary embodiments of the present principles applied to a Multi-view Video Coding extension of the MPEG-4 AVC standard, a new syntax is introduced in the slice header called ic_prediction_flag, which indicates whether illumination compensation (IC) is used for that slice. If the cross-view prediction is disabled for the whole slice, then ic_prediction_flag will be equal to zero and there will be no further IC-related syntaxes in the slice.

The degree of illumination mismatch varies from one part of the view image to another. Thus, it might not be efficient to send IC parameters for all the blocks using disparity compensation. To serve that purpose, a new block-based syntax flag called ic_enable is introduced in the macroblock/sub-macroblock level to indicate whether IC is utilized for one specific block.

The MPEG-4 AVC standard supports variable block size motion compensation, with block sizes ranging from 16×16 to 4×4. To reduce the overhead of sending too many ic_enable flags and ic_sym, the switching of IC need not to be applied on all block sizes. In one particular embodiment, the switching of IC is only applied on blocks with a size larger than, or equal to, 8×8.

The context adaptive binary arithmetic coding (CABAC) context design for the encoding of ic_enable is designed as followings: (1) for block sizes in {16×16, 16×8 or 8×16}, three CABAC contexts are used depending on the ic_enable flags of the upper and left macroblocks; and (2) for block size 8×8, a separate CABAC context is assigned without referring to neighboring blocks.

For illustrative purposes, the IC-related syntax tables are shown in Table 1 to Table 3. Table 1 illustrates the slice header syntax for Multi-view Video Coding (MVC). Table 2 illustrates macroblock layer syntax. Table 3 illustrates sub-macroblock prediction syntax.

TABLE 1

| slice_header( ) { | C | Descriptor |
|---|---|---|
|     first_mb_in_slice | 2 | ue(v) |
|     view_id | 2 | u (log2_max_view_num_minus1+1) |
|     view_slice_type | 2 | ue(v) |
|     if (view_slice_type == VL_SLICE) { | | |
|         num_ref_idx_ll_active_minus1 | 2 | ue(v) |
|         for (i=0; i<= num_ref_idx_ll_active_minus1; i++) | | |
| { | | |
|         left_ref_view_id[i] | 2 | ue(v) |
|     } | | |
| } | | |
|     if (view_slice_type == VR_SLICE) { | | |
|         num_ref_idx_lr_active_minus1 | 2 | ue(v) |
|         for (i=0; i<= num_ref_idx_lr_active_minus1; i++) | | |
| { | | |
|         right_ref_view_id[i] | 2 | ue(v) |
|     } | | |
| } | | |
|     if (view_slice_type == VB_SLICE) { | | |
|         num_ref_idx_ll_active_minus1 | 2 | ue(v) |
|         for (i=0; i<= num_ref_idx_ll_active_minus1; i++) | | |
| { | | |
|         left_ref_view_id[i] | 2 | ue(v) |
|     } | | |
|     num_ref_idx_lr_active_minus1 | 2 | ue(v) |
|         for (i=0; i<= num_ref_idx_lr_active_minus1; i++) | | |
| { | | |
|         right_ref_view_id[i] | 2 | ue(v) |
|     } | | |
| } | | |
|     ic_prediction_flag | 2 | u (1) |
|     ... | | |
|     slice_type | 2 | ue(v) |
|     pic_parameter_set_id | 2 | ue(v) |
|     frame_num | 2 | u(v) |
|     ... | | |

TABLE 2

| macroblock_layer( ) { | C | Descriptor |
|---|---|---|
|     mvc_pred_flag | 2 | u(1)\|ae(v) |
|     mb_type | 2 | ue(v)\|ae(v) |
|     if( ic_prediction_flag && mvc_pred_flag && mb_type >=1 && mb_type <=3 ){ | | |
|         ic_enable | 2 | u(1)\|ae(v) |
|         for( mbPartIdx = 0; mbPartIdx < NumMbPart( mb_type ); mbPartIdx++ ) | | |
| { | | |
|         ic_sym[ mbPartIdx ] | 2 | se(v)\|ae(v) |

TABLE 2-continued

| macroblock_layer( ) { | C | Descriptor |
|---|---|---|
|     } | | |
| } | | |
| if( mb_type == I_PCM ) { | | |
|     while( !byte_aligned( ) ) | | |
|         pcm_alignment_zero_bit | 2 | f(1) |
|     for( i = 0; i < 256; i++ ) | | |
|         pcm_sample_luma[ i ] | 2 | u(v) |
| ... | | |

TABLE 3

| sub_mb_pred( mb_type ) { | C | Descriptor |
|---|---|---|
|     for( mbPartIdx = 0; mbPartIdx < 4: mbPartIdx++ ) | | |
|         sub_mb_type[ mbPartIdx ] | 2 | ue(v)\|ae(v) |
|     if(ic_prediction_flag && mvc_pred_flag) { | | |
|         for( mbPartIdx = 0; mbPartIdx < 4; mbPartIdx++ ) { | | |
|             if (sub_mb_type[ mbPartIdx ]==P_L0_8x8) { | | |
|                 sub_mb_ic_enable[ mbPartIdx ] | 2 | u(1)\|ae(v) |
|                 if (sub_mb_ic_enable[ mbPartIdx ] ) { | | |
|                     sub_mb_ic_sym[ mbPartIdx ] | 2 | se(v)\|ae(v) |
|                 } | | |
|             } | | |
|         } | | |
|     } | | |
|     for( mbPartIdx = 0; mbPartIdx < 4; mbPartIdx++ ) | | |
|         if( ( num_ref_idx_l0_active_minus1 > 0 \|\| mb_field_decoding_flag ) && mb_type != P_8x8ref0 && sub_mb_type[ mbPartIdx ] != B_Direct_8x8 && SubMbPredMode( sub_mb_type[ mbPartIdx ] ) != Pred_L1 ) | | |
|             ref_idx_l0[ mbPartIdx ] | 2 | te(v)\|ae(v) |
|     for( mbPartIdx = 0: mbPartIdx < 4: mbPartIdx++ ) | | |

TABLE 3-continued

| sub_mb_pred( mb_type ) { | C | Descriptor |
|---|---|---|
|     if ( ( num_ref_idx_l1_active_minus1 > 0 ll mb_field_decoding_flag ) && <br>         sub_mb_type[ mbPartIdx ] != B_Direct_8x8 && <br>         SubMbPredMode( sub_mb_type[ mbPartIdx ] ) != Pred_L0 ) <br>         ref_idx_l1[ mbPartIdx ] <br> ... | 2 | te(v)\|ae(v) |

A description will now be given regarding disparity estimation with illumination compensation in accordance with an exemplary embodiment of the present principles.

In the particular scenario of a coding application, illumination compensation (IC) will be considered part of the disparity compensation process. More specifically, when IC is enabled in the disparity compensation of a block, the illumination compensated reference block, $B_r$, is calculated as follows:

$$B_r(x,y) = R(x+\Delta x, y+\Delta y) + ic\_offset$$

where $R(x,y)$ is the cross-view reference picture, and $(\Delta x, \Delta y)$ is the disparity vector (DV). As is shown in FIG. 5, DV/ic_offset/ic_enable are used together in the disparity compensation process.

Figure 5:
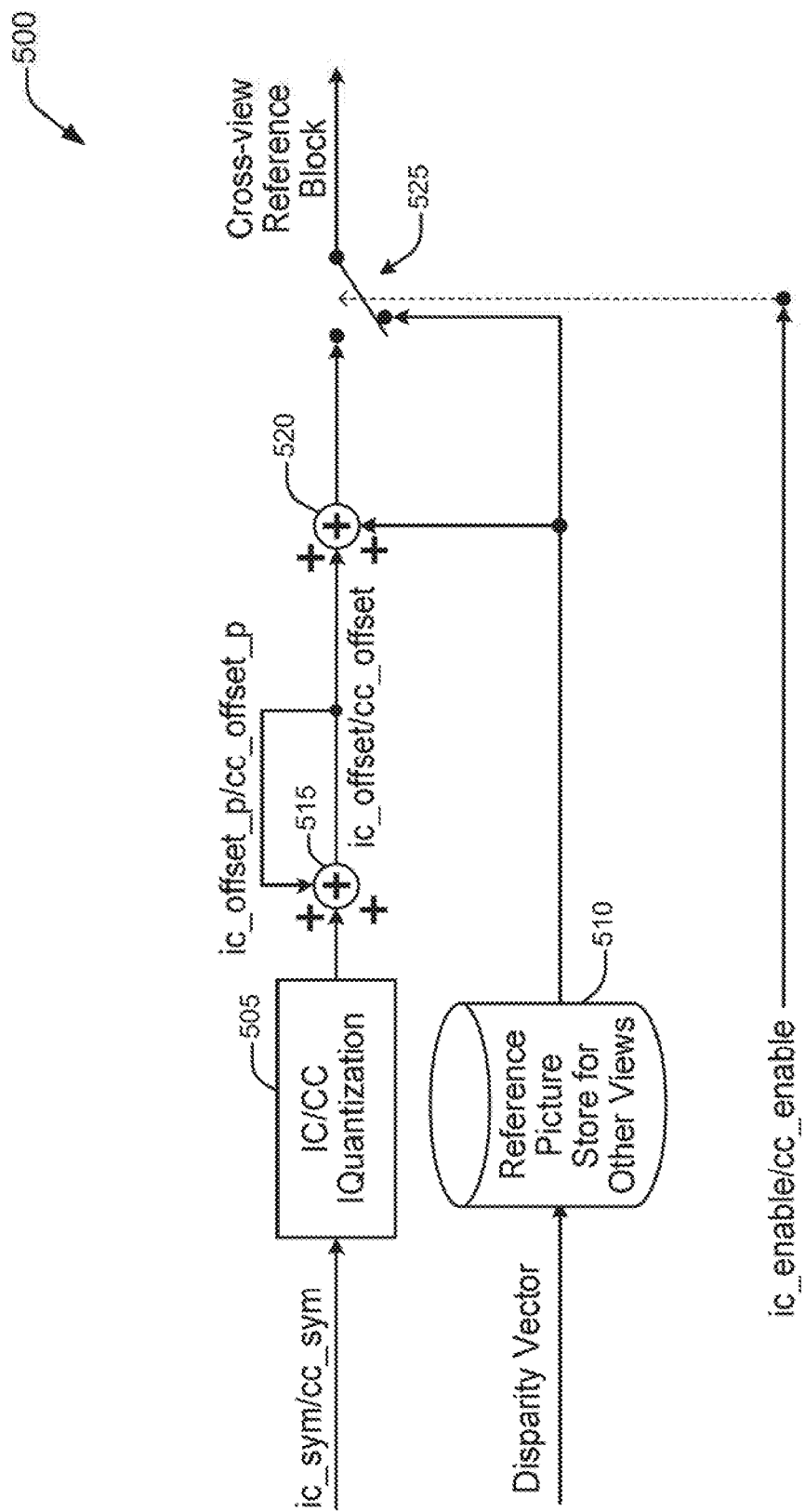
FIG. 5 is a block diagram for an exemplary apparatus for reference block generation with illumination compensation for multi-view video content to which the present principles may be applied in accordance with an embodiment thereof.

Turning to FIG. 5, an exemplary apparatus for reference block generation with illumination compensation for multi-view video content is indicated generally by the reference numeral 500. The apparatus 600 includes an illumination compensation quantizer 505 having an output connected in signal communication with a first non-inverting input of a combiner 515. An output of the combiner 515 is connected in signal communication with a second non-inverting input of the combiner 515 and with a first non-inverting input of a combiner 520.

An output of a reference picture store 510 (for other views) is connected in signal communication with a second non-inverting input of the combiner 520 and with a first input of a switch 525.

A second input of a switch 525 is connected in signal communication with an output of the combiner 520.

An input of the illumination compensation quantizer 505 is available as an input to the apparatus 500, for receiving ic_sym syntax. Moreover, an input of the reference picture store 510 is available as an input of the apparatus, for receiving disparity vectors. Further, the apparatus 500 includes an input for receiving an ic_enable syntax for controlling which input is selected by the switch 525. An output of the switch 525 is available as an output of the apparatus 500.

At the block-level, the illumination compensation parameter, ic_offset, is obtained through differential encoding and uniform quantization.

A description will now be given regarding differential encoding of ic_offset in accordance with an exemplary embodiment of the present principles.

There exists strong correlation among the ic_offset's in neighboring blocks. To take advantage of this property, the ic_offset is differentiated before quantization as follows:

$$ic\_offset = ic\_offset\_p + ic\_offset\_d$$

where ic_offset_d is the differentiated illumination compensation offset, and the illumination compensation predictor ic_offset_p is formed using the ic_offset's from the neighboring blocks.

The ic_offset_p is computed according to the following rules. In a first rule, the default value of ic_offset_p is 0. The default value is used when there is no neighboring block with IC available. In a second rule, ic_offset_p is set depending on the block size of the MB on the left, as follows: (1) if the block size=16×16, then the ic_offset of the left block is used; (2) if the block size=16×8 or 8×16, then the ic_offset of the second block is used; and (3) if the block size=8×8 or less, then the available ic_offset of 8×8 block index 3, 1, 2, 0 (in this order) is used. In a third rule, if there is no neighboring macroblock on the left, then ic_offset from the upper block is used instead.

A description will now be given regarding the quantization of ic_sym in accordance with an exemplary embodiment of the present principles.

Uniform quantization is applied to the differentiated ic_offset:

$$ic\_offset = ic\_offset\_p + ic\_sym * \mu$$

If a fixed step-size quantization method is used, there is no need for extra syntax to signal $\mu$. In the case when a fixed step-size quantization is not utilized, the transmission of syntax should be considered.

A description will now be given regarding entropy coding of ic_sym in accordance with an exemplary embodiment of the present principles.

For ic_sym, unary binarization is used in CABAC. For example, if |ic_sym| is 1, then it is binarized as "10", and if ic_sym is 3, then it is binarized as "1110". Since ic_sym is differentially encoded, a value of ic_sym close to 0 is more likely to occur. To exploit this property, four different contexts are assigned to each binarized symbol. After binarization, one symbol bit may be added in the end, which is encoded with no context.

A description will now be given regarding color compensation in accordance with an exemplary embodiment of the present principles.

Poor camera calibration can also cause color mismatches in addition to the illumination mismatch. Some embodiments of the present principles address this problem by extending the illumination compensation (IC) approach previously described to color compensation (CC). For simplicity sake, it will be presumed that color compensation is applied to the UV color components of the YUV color space. However, it is to be appreciated that, given the teachings of the present principles provided herein, one of ordinary skill in this and related arts will contemplate and readily implement the present principles with respect to other color spaces, while maintaining the scope of the present principles.

Two exemplary methods will now be described with respect to color compensation in accordance with the present principles. The first is a local color compensation method and the second is a global color compensation method. Of course, given the teachings of the present principles provided herein, variations and extensions of the two approaches described herein are readily contemplated by one of ordinary skill in this and related arts, while maintaining the scope of the present invention.

In the local color compensation method, similar to illumination compensation (IC), a local color compensation parameter cc_offset is introduced. These two different cc_offset's for the U and V channels share the same flag ic_enable and the same disparity vector.

For the YUV420 chrominance sampling format, the width and height of the chrominance block is half of the luminance block. To avoid spending too many bits on the color compensation syntaxes, the block size for color compensation is fixed to be 8×8. The cc_enable flag can either be signaled independent of ic_enable, or can be derived from ic_enable.

With respect to the global color compensation method, generally chrominance channels are much smoother than the luminance channel. A more economical method for color compensation is to use a global compensation parameter: cc_offset_global. Global cc_offset can be calculated in the slice or frame level and be applied to every block in the same slice or frame.

A description will now be given of some of the many attendant advantages/features of the present invention, some of which have been mentioned above. For example, one advantage/feature is a video encoder that includes an encoder for encoding a picture by enabling color compensation of at least one color component in a prediction of the picture based upon a correlation factor relating to color data between the picture and another picture. The picture and the other picture have different view points and both corresponding to multi-view content for a same or similar scene.

Another advantage/feature is the video encoder as described above, wherein the encoder encodes the picture to provide a resultant bitstream compliant with at least one of the International Organization for Standardization/International Electrotechnical Commission Moving Picture Experts Group-4 Part 10 Advanced Video Coding standard/International Telecommunication Union, Telecommunication Sector H.264 recommendation and an extension thereto.

Yet another advantage/feature is the video encoder as described above, wherein the encoder uses a high-level syntax to enable the color compensation.

Moreover, another advantage/feature is the video encoder that uses a high-level syntax as described above, wherein the high-level syntax includes a slice-level syntax.

Further, another advantage/feature is the video encoder as described above, wherein the encoder uses a block-level syntax to indicate whether the color compensation is used in the prediction for the picture.

Also, another advantage/feature is the video encoder that uses a block-level syntax as described above, wherein the encoder uses context adaptive binary arithmetic coding contexts for coding the block-level syntax, the context adaptive binary arithmetic coding contexts selected based on block size.

Additionally, another advantage/feature is the video encoder as described above, wherein the encoder uses a block-level syntax to signal color compensation information.

Moreover, another advantage/feature is the video encoder that uses the block-level syntax as described above, wherein the encoder uses context adaptive binary arithmetic coding contexts for coding the block-level syntax, the context adaptive binary arithmetic coding contexts selected based on block size.

Also, another advantage/feature is the video encoder that uses the block-level syntax as described above, wherein the color compensation information includes a color offset parameter.

Additionally, another advantage/feature is the video encoder as described above, wherein the encoder uses a slice-level syntax to signal an amount of color compensation applied on chrominance channels of an entire slice corresponding to the picture.

Moreover, another advantage/feature is the video encoder as described above, wherein the encoder encodes the picture by also enabling illumination compensation in the prediction of the picture based upon a correlation factor relating to illumination data between the picture and the other picture.

Further, another advantage/feature is the video encoder that encodes the picture by also enabling illumination compensation as described above, wherein the encoder uses a slice-level syntax to enable the illumination compensation.

Also, another advantage/feature is the video encoder that encodes the picture by also enabling illumination compensation as described above, wherein the encoder uses a block-level syntax to indicate whether the illumination compensation is used in the prediction for the picture.

Additionally, another advantage/feature is the video encoder that encodes the picture by also enabling illumination compensation as described above, wherein different block-level syntaxes are used to indicate the illumination compensation and the color compensation, respectively, and the different block-level syntaxes are signaled independently.

Moreover, another advantage/feature is the video encoder that encodes the picture by also enabling illumination compensation as described above, wherein different block-level syntaxes are used to indicate the illumination compensation and the color compensation, respectively, and one of the different block-level syntaxes is derived from another one of the different block-level syntaxes.

Further, another advantage/feature is the video encoder that encodes the picture by also enabling illumination compensation as described above, wherein the encoder uses a block-level syntax to signal illumination compensation information.

Further, another advantage/feature is the video encoder that encodes the picture by also enabling illumination compensation and that uses a block-level syntax as described above, wherein the encoder uses context adaptive binary arithmetic coding contexts for coding the block-level syntax, the context adaptive binary arithmetic coding contexts selected based on block size.

Also, another advantage/feature is the video encoder that encodes the picture by also enabling illumination compensation and that uses a block-level syntax as described above, wherein the illumination compensation information includes an illumination offset parameter.

Additionally, another advantage/feature is the video encoder that encodes the picture by also enabling illumination compensation as described above, wherein the encoder uses differential encoding of at least one of illumination compensation parameters and color compensation parameters on a block-level.

Moreover, another advantage/feature is the video encoder that encodes the picture by also enabling illumination compensation and that also uses differential encoding as described above, wherein the encoder applies uniform quantization on at least one of the differential encoded illumination compensation parameters and the differential encoded color compensation parameters.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. An apparatus, comprising:
an input to receive a bitstream comprising coded pictures and high-level syntax comprising parameters to enable color compensation;
a video decoder configured to decode a picture in the bitstream by selectively enabling color compensation of at least one color component in a prediction of the picture based upon a correlation factor relating to color data between the picture and another picture in the bitstream, the picture and the other picture having different view points and both corresponding to multi-view content for a same or similar scene, wherein the correlation factor is determined based on one or more parameters of the high-level syntax.

2. The apparatus of claim 1, wherein the high-level syntax is provided at the slice-level.

3. An apparatus, comprising:
an input to receive a bitstream comprising coded pictures and high-level syntax comprising parameters to enable illumination compensation;
a video decoder configured to decode a picture in the bitstream by selectively enabling illumination compensation in a prediction of the picture based upon one or more illumination compensation parameters in the high-level syntax relating to luminance data between the picture and another picture in the bitstream, the picture and the other picture having different view points and both corresponding to multi-view content for a same or similar scene.

4. The apparatus of claim 3, wherein the high-level syntax is provided at the slice-level.

5. The apparatus of claim 3, wherein the parameters to enable illumination compensation comprise a flag indicating whether illumination compensation is enabled or not.

6. The apparatus of claim 3, wherein the parameters to enable illumination compensation comprise an illumination offset parameter.

* * * * *